Dec. 22, 1964 J. M. RELPH ETAL 3,162,022
AUGER ICE MAKING MACHINE
Filed Oct. 16, 1961 2 Sheets-Sheet 2
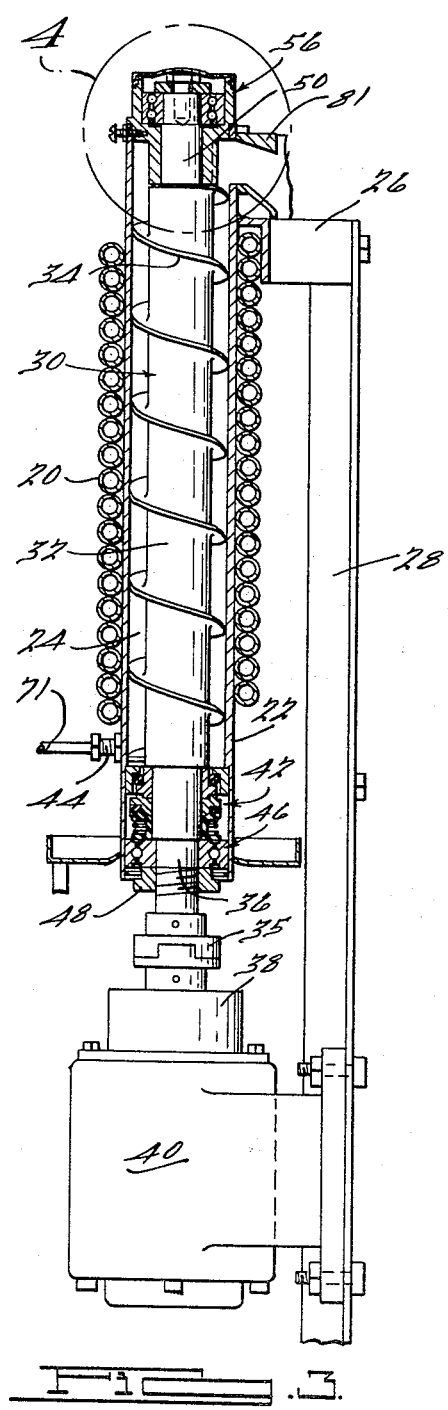
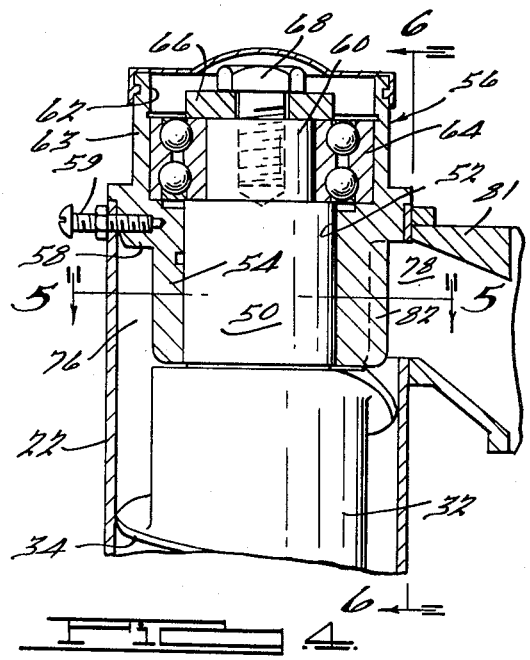
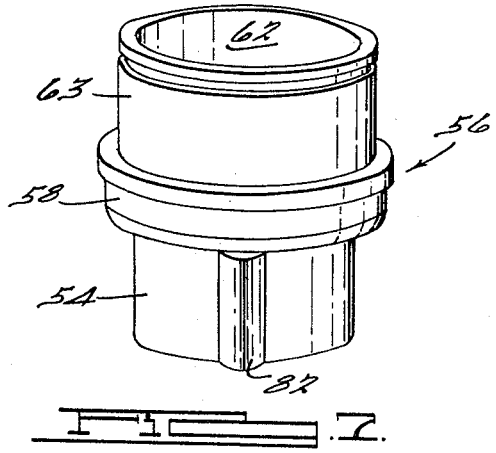
INVENTORS.
James M. Relph
Cyrus G. Minkler
BY
James M. Relph
ATTORNEY United States Patent Office 3,162,022
Patented Dec. 22, 1964

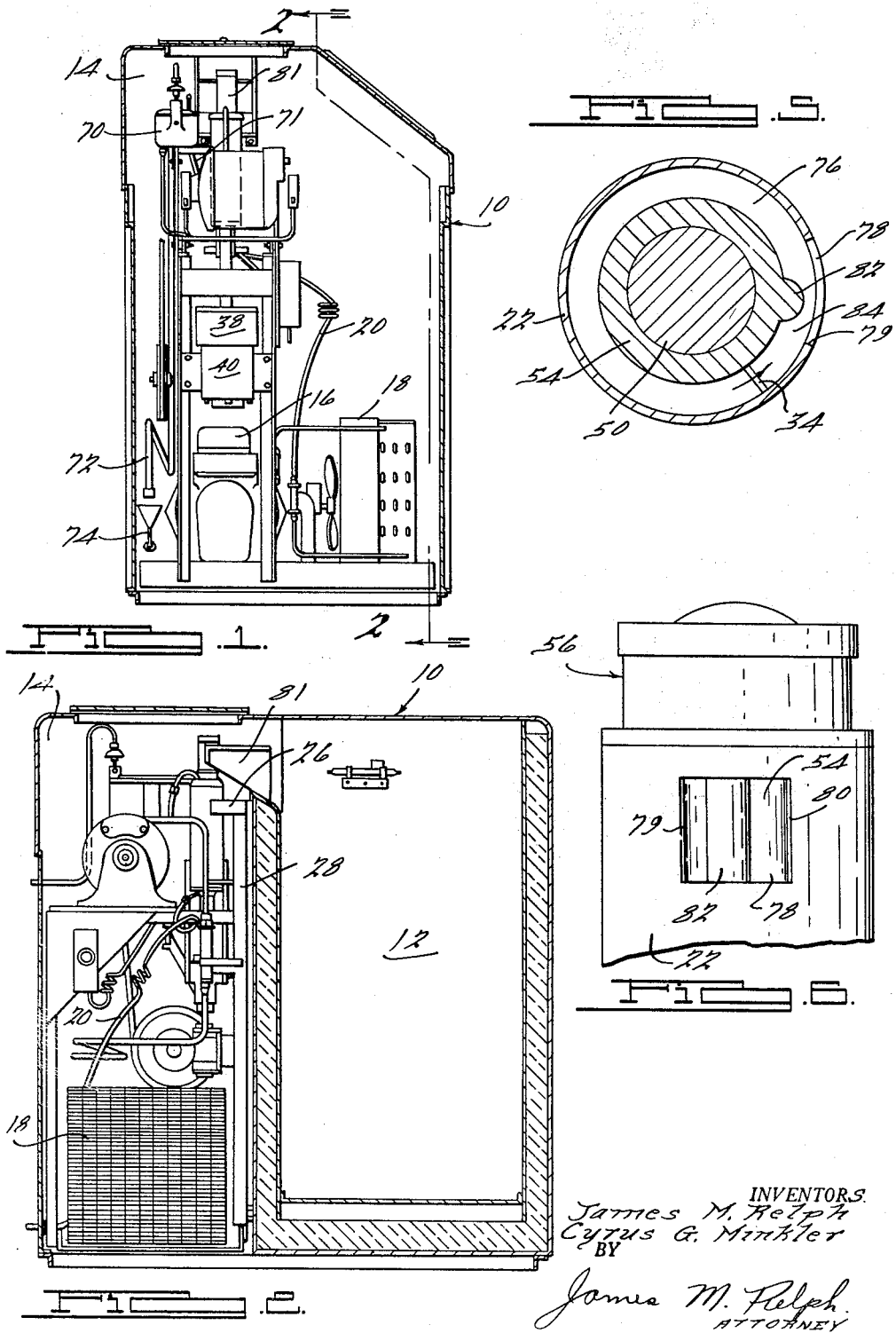

3,162,022
AUGER ICE MAKING MACHINE
James M. Relph, Ann Arbor, and Cyrus G. Minkler, Pleasant Ridge, Mich., assignors to King-Seeley Thermos Co., Ann Arbor, Mich., a corporation of Michigan
Filed Oct. 16, 1961, Ser. No. 145,163
1 Claim. (Cl. 62—320)

This invention relates to ice-making apparatus and more particularly to ice-making apparatus for producing small particles of ice, known commercially as ice chips or flakes.

The present invention is an improvement upon ice-making apparatus of the auger or screw type having an elongated hollow cylindrical element defining a freezing chamber. As described in Patent No. 2,753,694 dated July 10, 1956, by F. A. Trow et al. for Ice Disintegrating and Chip Delivering Spiral Ice Chip-Producing Machine, and Patent No. 2,825,209 dated March 4, 1958 by J. L. Nelson et al. for Apparatus for Producing Compressed Ice Chips, such apparatus includes means for supplying water to the inside of the cylindrical element and means for circulating a refrigerant in cooling relationship with a portion of the outer surface of the cylindrical element for forming a thin layer of ice on the inner surface thereof. An elongated shaft portion of an auger is centrally aligned within the cylindrical element and carries a helical screw on its periphery which has an outer diameter which is slightly smaller than the inside diameter of the cylindrical element so that the outer edge of the screw is in close working relationship with the inner surface of the cylindrical element for removing the thin layer of ice formed thereon.

Once the thin ice layer is removed from the inner surface of the cylindrical element water again freezes thereon to form a new layer of ice which is again removed by the helical screw. The layers of ice removed from the inner surface of the cylindrical element are moved toward the elongated shaft portion to form a mass of semi-solid frozen material, comprising alternate laminations of ice and water, which is delivered to the upper end of the freezing chamber by the rotating screw.

In further accordance with the inventions described and claimed in the aforesaid patents, the present invention employs breaker means mounted within the freezing chamber at the upper end thereof adjacent the outlet end of the screw to convert the semi-solid ice mass of frozen material into substantially dry particles of ice. The present improvements reside principally in the form and structure of the breaker.

Important objects of this invention, therefore, are to produce particles of substantially dry ice having uniform size and hardness from an automatic ice-making apparatus of the auger or screw type; to provide such an apparatus embodying an ice breaker or disintegrating member of improved form and structure; and to provide such an apparatus in which the breaker has an ice disintegrating ridge extending vertically thereof for breaking ice, delivered by the auger and compressed by the breaker.

With the above as well as other and, in certain cases, more detailed objects in view, a preferred but illustrative embodiment of the invention is shown in the accompanying drawings throughout the several views of which corresponding reference characters are used to designate corresponding parts and in which:

FIGURE 1 is a view in elevation of one end of ice-making apparatus constructed in accordance with certain of the principles of the present invention with its outer casing removed;

FIG. 2 is a view in vertical section taken along the line 2—2 of FIG. 1;

FIG. 3 is a view in elevation of the side of the ice-producing portion of the improved apparatus showing the freezing assembly in vertical section;

FIG. 4 is an enlarged view of area 4 in FIG. 3;

FIG. 5 is a view in horizontal section taken along the line 5—5 of FIG. 4;

FIG. 6 is a view in vertical section taken along the line 6—6 of FIG. 4; and

FIG. 7 is a view in perspective of the ice-breaking bushing portion of the improved apparatus.

One embodiment of apparatus constructed in accordance with certain of the principles of the present invention is illustrated in the drawings (FIGS. 1 and 2) as including an outer casing 10 which is divided into an ice storage compartment 12 and an ice-making apparatus housing portion 14. The ice-producing apparatus enclosed within the housing portion 14 comprises a conventional refrigeration circuit having a motor-driven compressor 16, a condenser 18 and an expansion coil 20 in cooling relationship with an elongated hollow cylindrical member 22 (FIG. 3). More particularly, coil 20 is wound on the outer surface of member 22 to define a freezing chamber 24 within the surrounded area. Suitable connecting means such as a bracket 26 support the elongated cylindrical member 22, representatively shown in a substantially upright position, at the upper end thereof on a supporting frame 28 mounted within the housing portion 14. An auger 30 having an elongated shaft 32 and a helical screw 34 carried on the outer periphery thereof is journaled within the cylindrical element 22. The auger 30 is driven in a conventional manner by means representatively including a flexible drive coupling 35 interconnecting a small diameter portion 36 of the shaft 32 directed outwardly of the lower end of the cylindrical element 22 and a reduction gear housed in a gear box 38 mounted on a drive motor 40 which is mounted on the lower end of the supporting frame 28.

Conventional seal means 42 are mounted in water-tight relationship with the auger shaft 32 and the inner surface of the lower end of the cylindrical element 22 so that water can be maintained at a predetermined level in the freezing chamber 24 to form a thin layer of ice on the inner surface of the cylindrical element 22. The water is delivered into the chamber 24 through a threaded connector element 44 communicating with the chamber 24.

The alignment of the auger 30 within the hollow cylindrical element 22 is accurately maintained so that the outermost edge of the screw 34, which has an outside diameter slightly smaller than the inside diameter of the inner surface of the cylindrical element 22, will be equally spaced from the inner surface of the cylindrical element 22. The lower end of the auger 30 is aligned by a bearing 46 which engages the reduced diameter portion 36 of the shaft 32 and the inner surface of the cylindrical element 22 at the bottom end thereof for positioning the lower end of the shaft 32 centrally within the cylindrical element 22. In the illustrated embodiment, the reduced diameter portion 36 of the shaft 32 is threaded and receives an internally threaded bearing retaining nut 48 thereon to securely hold the bearing 46 against axial shifting movement. The retaining nut 48 and bearing 46 also hold the seal means 42 in water-tight engagement with the shaft 32 and the inner surface of the cylindrical element 22.

The opposite end of the shaft 32 includes a first small diameter portion 50 mounted in an aperture 52 in the lower end 54 of an ice disintegrating member 56 which has a central flange or shoulder portion 58 engaging the uppermost end of the cylindrical element 22 in supported relationship therewith. Suitable fastening means, such as a screw 59, threadingly engages the element 22 and the shoulder 58 to prevent relative movement therebetween.

A second smaller diameter shaft portion 60 extends upwardly from the shaft portion 50 into a recess 62 formed in a top portion 63 of the ice disintegrating member 56 with the small diameter portion 60 being centered by a bearing 64 mounted between the inner surface of the top portion 63 and the shaft portion 60 for centering the upper end of the auger shaft 32 within the cylindrical element 22. A bearing retainer 66 is held in axial abutment with the bearing 64 by a stud 68 in threaded engagement with the shaft portion 60.

As the centrally aligned auger 30 is rotated by the motor 40, the outer edges of the screw 34 will scrape a layer of ice formed on the inner surface of the cylindrical element 22 allowing water to contact the inner surface thereof to form another layer of ice thereon which is also scraped off the inner surface of element 22 by the outer edges of the screw 34. The layers of ice are moved toward the outer periphery of the shaft 32 and upwardly in the cylindrical element 22 by rotation of the auger 30 to form a semi-solid mass of frozen material comprising laminations of water and ice. As the auger is moving the mass of laminated ice upwardly in the cylindrical element 22, the water level within the cylindrical element is maintained substantially constant by a float control reservoir tank 70 which is connected by suitable conduit means 71 to the threaded connector element 44. In the event that the float valve (not shown) within the tank 70 becomes inoperative, an overflow level limiting drain conduit 72 is mounted therein and discharges to a suitable drain outlet 74.

Since the water level is maintained constant in the cylindrical element 22, layers of ice are continuously forming on the inner surface thereof. Each layer is scraped from the inner surface of the cylindrical element 22 and moved to the upper outlet end of the screw 34 at a point adjacent the outer surface of the bottom portion 54 of the ice disintegrating member 56. The outer diameter of the bottom portion 54 is less than the inner diameter of the cylindrical element 22 at the upper end thereof so that the bottom portion 54 and inner surface of the element 22 define an annular space 76 closed at the upper end thereof by the shoulder 58. A discharge opening 78 having edge 79 and edge 80 is formed in the upper end of the cylindrical element 22 to interconnect the annular space 76 with a hollow discharge chute 81 which delivers particles of ice to the ice storage compartment 12.

As the laminated mass of water and ice moves upwardly into the annular opening 76, the mass will be compressed by the action of the screw 34 which presses the mass against the shoulder 58 to squeeze water therefrom which flows downwardly into the lower end of the cylindrical element 22. As best illustrated in FIG. 5, the mass of ice in the opening 76 rotates in a counterclockwise direction to a point adjacent the edge 79 of the discharge opening 78 where, in accordance with the present invention, it encounters a protuberance or ridge 82 on the outer surface of the bottom portion 54 of the ice disintegrating member 56. The ridge 82 is representatively illustrated as extending axially along the surface of the bottom portion 54 between the base thereof and the shoulder 58 on a line spaced inwardly of the inner surface of the cylinder 22 and having a smooth arcuate surface of uniform height through its length. Ridge 82 which is substantially narrower, measured circumferentially of member 54 than the width of opening 78, thus defines a restricted inlet passage 84 leading to the discharge opening 78.

The ice compressed upwardly in the opening 76 against the shoulder 58 also moves in a counterclockwise direction as illustrated in FIG. 5 through the restricted inlet 84. The ice is also caused to ride up over the ridge 82. These actions further compress the ice mass into a clear, solid, substantially dry layer of hard ice and disintegrate or break that layer into small particles.

In a generic sense the ridge 82 may be located at various positions between the edges 79 and 80, but a generally central position is preferred and is illustrated. The combination of the compressing action between the rotating screw 34 at the upper end of the cylindrical element 22 and the shoulder 58 as well as the compressing and breaking action at the restricted inlet passage 84 and ridge 82 produces unusually high quality particles of clear ice which are substantially dry and of quite uniform size and hardness.

While it will be apparent that the embodiment of the invention herein disclosed is well calculated to fulfill the objects of this invention, it will be appreciated that the invention is susceptible to modification, variation and change without departing from the proper scope or fair meaning of the subjoined claim.

What is claimed is:

Ice making apparatus having a tubular ice forming chamber, ice removing means mounted in said ice forming chamber to remove ice by rotative and axial displacement, ice discharge means having side surfaces extending substantially parallel to the direction of axial displacement of ice from said ice forming chamber, an ice compacting chamber provided at one end of said tubular ice forming chamber adjacent said ice discharge means to receive and compact the ice prior to delivery through said ice discharge means, said ice compacting chamber being defined by an internally mounted member of reduced diameter fixedly mounted relative to said ice removing means, a shoulder portion formed on said internally mounted member and extending radially from said internally mounted member to provide a first abutment means extending substantially transversely to the direction of movement of ice during axial displacement by said ice removing means, a radially protruding rib having a smooth arcuate surface of uniform height throughout its length and extending along the length of said internally mounted member between said shoulder portion and said ice forming chamber to define a second abutment means extending substantially transversely to the first abutment means and substantially transversely to the direction of movement of ice during rotative displacement by said ice removing means and being aligned with said ice discharge means and having side surfaces extending substantially parallel to said side surfaces of said ice discharge means and being substantially narrower than the width of said ice discharge means and defining a restricted outlet passage from said ice compacting chamber to said ice discharge means to cause disintegration of compacted ice moving from said ice compacting chamber to said ice discharge means.

References Cited in the file of this patent
UNITED STATES PATENTS

| | | |
|---|---|---|
| 2,753,694 | Trow | July 10, 1956 |
| 2,825,209 | Nelson | Mar. 4, 1958 |
| 2,952,141 | Nelson | Sept. 13, 1960 |
| 2,962,878 | Keller | Dec. 6, 1960 |